(12) United States Patent
Noga et al.

(10) Patent No.: US 6,421,093 B1
(45) Date of Patent: Jul. 16, 2002

(54) DEVICE FOR STORING, DECODING, AND DISPLAYING IMAGES INCLUDING AUTOMATIC SELECTION OF PARTICULAR DIGITAL IMAGE INFORMATION

(75) Inventors: Takehiro Noga; Kinji Atsumi, both of Tokyo; Yoshihiro Yamamura, Kakegawa, all of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/409,846

(22) Filed: Oct. 1, 1999

(30) Foreign Application Priority Data

Oct. 2, 1998 (JP) .................................. 10-281754

(51) Int. Cl.[7] .............................. H04N 5/44; H04N 9/74

(52) U.S. Cl. ...................................... 348/553; 348/578

(58) Field of Search ........................... 348/553, 575, 348/576, 578, 714, 715; H04N 5/44, 5/14, 9/74, 9/64

(56) References Cited

FOREIGN PATENT DOCUMENTS

| JP | 7-255030 | 10/1995 |
|----|----------|---------|
| JP | 8-79637 | 3/1996 |
| JP | 8-88829 | 4/1996 |
| JP | H8-223525 | 8/1996 |
| JP | 9-146574 | 6/1997 |
| JP | 10-42195 | 2/1998 |
| JP | 10-200853 | 7/1998 |
| JP | 10-233955 | 9/1998 |
| JP | H11-331739 | 11/1999 |

*Primary Examiner*—Sherrie Hsia
(74) *Attorney, Agent, or Firm*—Foley & Lardner

(57) ABSTRACT

The automatic image changing and reproducing display device comprises, in a medium storage portion, an automatic image changing circuit and a plurality of memory circuits composed of semiconductor elements, such as ROMs, having a memory capacity that is sufficient for storing image information as digital signals. A particular piece of digital image information is selected by changing the memory circuits by means of the automatic changing circuit. A decoding circuit executes a decoding processing for the particular digital image information which has been selected and outputted from the memory circuits.

5 Claims, 2 Drawing Sheets

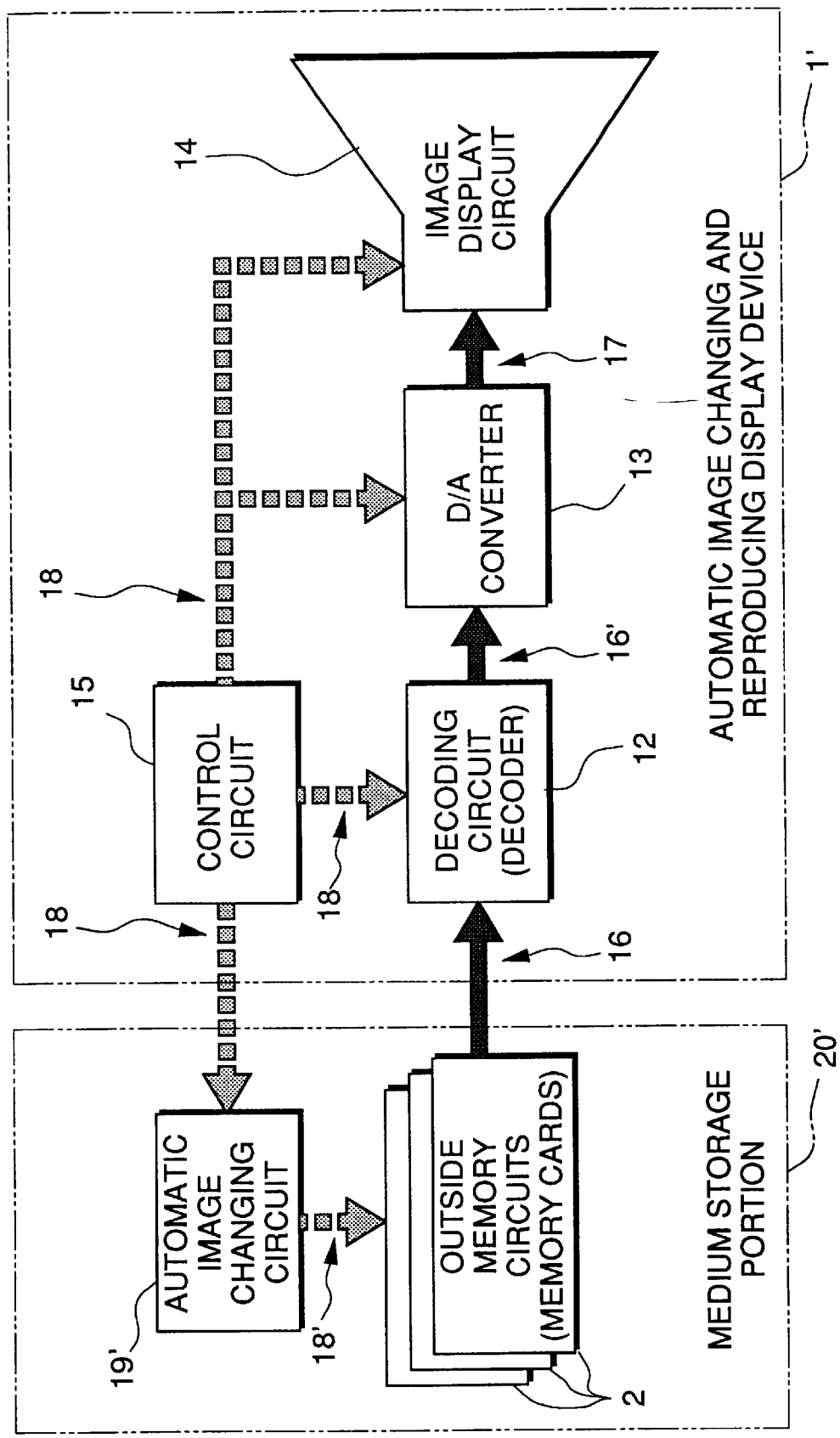

DEVICE FOR STORING, DECODING, AND DISPLAYING IMAGES INCLUDING AUTOMATIC SELECTION OF PARTICULAR DIGITAL IMAGE INFORMATION

BACKGROUND OF THE INVENTION

1. Field of the Invention

The present invention relates to a image reproduction and display device which stores digital image information and displays images by reproducing the stored digital image information, and particularly relates to an automatic image changing reproduction and display device which possesses an automatic image changing circuit in an image storage portion for changing digital image information in a particular memory circuit among digital image information stored in a plurality of memory circuits in the image storage portion.

2. Background Art

Image reproduction and display devices, which store digital image information and display images by reproduction of the stored digital image information, generally includes image recording and reproducing devices such as imaging devices like television cameras, VTRs (Video Tape Recorders), LD (Laser Disc) players, and DVD (Digital Video Disc) players, and computer devices such as personal computers and work stations which receive image signals from computers and display images.

Recently, consumer image reproduction and devices have been required to provide high reliability and long life as a whole system. In order to respond to these requirements, high reliability and long life have been provided for image recording and reproducing devices such as consumer VTRs, LD players, and DVD players, by manufacturing them in accordance with service specifications and by the use of highly reliable and long life elements.

In addition, automatic image changing and reproducing devices are provided by combining a plurality of the same image recording and reproducing devices and such devices are realized as VTR cartridge changers, LD changers, or DVD changers, which are capable of automatically changing image information.

However, obviously there are limits for improving the reliability and the lifetime of the image recording and reproducing devices only by manufacturing in accordance with service specifications and by the use of high quality elements.

That is, since the image recording and reproducing devices such as VTRs, LD players, and DVD players are provided with structural rotating portions and, as a result, these devices are accompanied by factors connected to failures of the machine such as contamination by dust or dirt, electrification by static charges, parts failures and service life of motors or belts.

In the case of a VTR, since the video tape and the reproducing head are always in mutual contact, wear of the contact surfaces is inevitable.

In the case of image reproducing devices such as LD players and DVD players, although no mechanical contact is involved between the optical disc and the reproducing head, the problem arises that, because the reproducing head has optical components composed of laser diode and optical lenses, the reproducing head may be subjected to malfunctions caused by reduction of the life of the laser diode, electrostatic breakdown by electrification or by contamination or scratches.

In general, the recording, reproducing and display system is constructed by one image recording and reproducing device and another image reproducing and display device, and as a result, automatic image changing and reproducing display devices such as VTR cartridge changers, LD changers, and DVD changers composed of a plurality of the same image recording and reproducing devices (VTRs, LD players, and DVD players) and an automatic image changing portion become considerably large.

That is, the automatic image changing and reproducing device according to the conventional technology comprises not only a plurality of the same image recording and reproducing devices, but also a medium storage portion which stores a large quantity of recording media such as VTR cassettes, LD discs, and DVD discs, and the device must further comprises medium changing mechanisms, so that it is difficult to reduce the size of the device as a whole.

It is therefore an object of the present invention to provide an image reproducing and display system as a whole provided with high reliability, long service life and reduced size.

SUMMARY OF THE INVENTION

According to the first aspect of the present invention, an automatic image changing and reproducing display device of the present invention is provided with a plurality of memory circuits for storing digital image formation which is encoded and compressed by a particular technique; a decoding circuit for decompressing and decoding said digital image information stored in said memory circuits and for outputting a result as digital image data; a D/A converter for converting said digital image data and for outputting a result of conversion as analog image signals; and an image display circuit for displaying said analog image signals; the automatic image changing and reproducing display device further comprising: an automatic image changing circuit for automatically changing particular digital image information among plural pieces of digital image information stored in a plurality of memory circuits in a medium storage portion, when the digital image information is composed of plural pieces of digital image information.

According to the second aspect of the present invention, in the automatic image changing and reproducing display device according to the first aspect, the plurality of memory circuits, constructed by semiconductor elements such as ROMs possess a memory capacity capable of storing said digital image information as encoded and compressed data corresponding to more than hundreds of frames or a length of more than a few minutes.

According to the third aspect of the present invention, in the automatic image changing and reproducing display device according to the first aspect, said plurality of memory circuits is constructed by detachable memory devices such as memory cards formed by ROMs, in which said digital image information is stored.

According to the fourth aspect of the present invention, in the automatic image changing and reproducing display device according to the first aspect, said plurality of detachable memory circuits such as said memory cards possess a memory capacity capable of storing said digital image information as encoded and compressed data corresponding to more than hundreds of frames or a length of more than a few minutes.

According to the fifth aspect of the present invention, in the automatic image changing and reproducing display device according to the first aspect, said digital image information is encoded and compressed by predetermined coding codes such as MPEG 2.

BRIEF DESCRIPTION OF THE DRAWINGS

FIG. 2 is a block diagram showing a structure of an automatic image changing and reproducing display device according to another embodiment of the present invention.

DETAILED DESCRIPTION OF THE INVENTION

Figure 1:
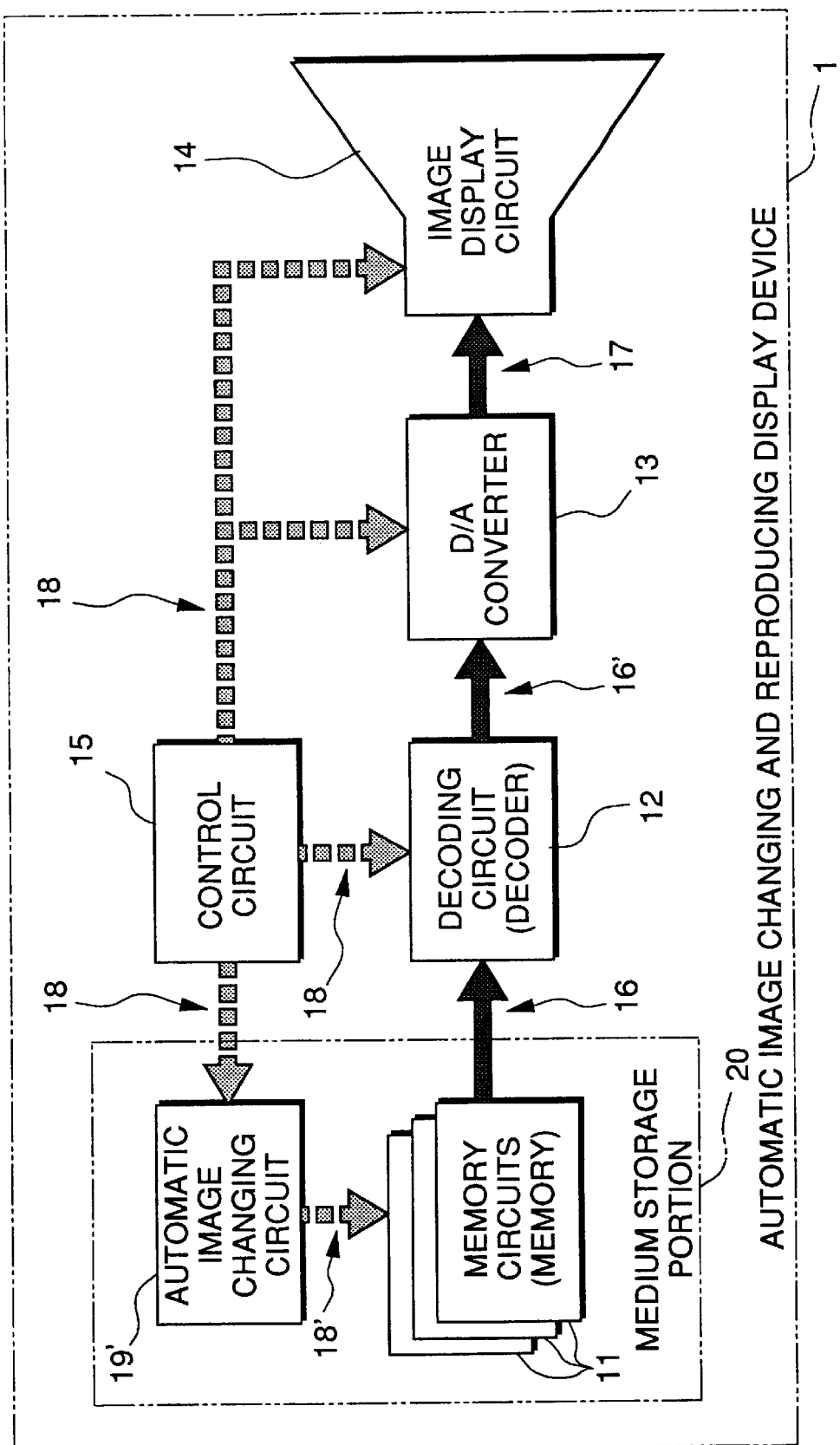
FIG. 1 is a block diagram showing a structure of an automatic image changing and reproducing display device according to the first embodiment of the present invention.

The embodiments of the present invention will be described hereinafter with reference to FIGS. 1 and 2.

FIG. 1 is a block diagram showing a structure of an automatic image changing and reproducing display device according to the first embodiment of the present invention. Referring to FIG. 1, an automatic image changing and reproducing display device 1 possesses a medium storage portion 20 for storing and controlling a plurality of memory media (memory devices), and the medium storage portion 20 comprises a plurality of memory circuits (memories) 11, 11, . . . , constructed by semiconductor elements such as ROM (Read Only Memory) and an automatic image changing circuit 19.

The automatic image changing circuit 19 is constructed by, for example, a semiconductor logic circuit and outputs digital image information 16 from an selected particular memory circuit 11 to the decoding circuit (decoder) 12 at the next stage, by activating a particular memory circuit 11 optionally by a control signal 18' which is obtained by changing a plurality of memory circuits 11 according to the control signal 18 input from the control circuit 15.

The memory circuits 11 are constructed by memories such as ROMs, and, following the control signal 18' input from the automatic image changing circuit, permanently store the digital image information 16 which is input as compressed information after encoding and compressing image signals according to a standard such as MPEG (Moving Picture Experts Group) 2 standard by means of an outside encoding device (encoder) (not shown) from outside image recording and reproducing devices such as imaging devices like television cameras, VTRs, LD players, and DVD players, and computer devices such as engineering workstations which are not shown in the figure.

The decoding circuit (decoder) 12 executes decoding and decompression of the thus encoded and compressed digital image information stored in the memory circuit 11 according to a standard such as the MPEG 2, and outputs digital image information resulting from the processing.

The D/A converter, following the control signal 18 input from the control circuit 15, converts the input digital image information 16' into analog signals and outputs the thus obtained analog image signal 17. The image display circuit 14, following the control signal 18 from the control circuit 15, displays images by the input analog image signals 17.

Furthermore, the memory circuits 11, which are constituted of semiconductor elements such as ROMs and the like should be provided with a memory capacity sufficient to store the compressed digital image information (images of more than hundreds of frames and more than several minutes) according to the MPEG 2 standard.

An example of the operation of the above described first embodiment will be explained with reference to FIG. 1.

The automatic changing circuit 19, following a control signal 18 input from the control circuit 15, executes changing control of a plurality of memory circuits 11 stored in the storage portion by the control signal 18' and activates only a particular memory circuit.

The memory circuits 11, constituted of semiconductor elements, following the control signal 18' input from the automatic image changing circuit 19, outputs the stored digital image information to the decoding circuit 12 at the next stage for processing decoding according to, for example, the MPEG 2 standard.

The memory circuit 11 repeats the reading (output) operation (repeat reproducing), for example, the stored digital image information 16 from the top, following the control signal 18' from the automatic image changing circuit 19, at the time when the output (reading) operation is completed.

Thereby, the decoding circuit 12, which carries out the decoding processing according to, for example., MPEG 2, following the control signal 18 input from the control circuit 15, executes extension and decoding processing of the digital image information 16, which is compressed according to MPEG 2 and input from the memory circuits 11, and outputs the digital image information as a result of decoding to the D/A converter 13.

The D/A converter, following a control signal 18 from the control circuit 15, converts the digital image information input from the decoding circuit 12 into analog image signals 17 and outputs the analog image signals 17 to the image display circuit 14.

Subsequently, the image display circuit 14 displays the analog image signals 17 input from the D/A converter 13 as images on the display screen, following the control signal 18 from the control circuit 15.

Accordingly, the automatic image changing and reproducing display device 1 is provided with a plurality of memory circuits 11 constituted by semiconductor elements such as ROMs in the medium storage, which is sufficient (for example, a level of a few Giga bits) for storing the digital image information (images having more than hundreds of frames and several minutes of length). The plurality of memory circuits 11 stores the digitalized image information as digital signals which are obtained previously by the encoder according to MPEG 2 by encoding and compressing the digital image information from imaging devices such as televison cameras, VTRs, LD players, and DVD players, and from computer devices such as personal computers and engineering workstations.

Since the automatic image changing and reproducing display device 1 of the present invention is provided with a decoding circuit 12 for extension and decoding the digitalized image information compressed according to MPEG 2 and the decoding circuit 12 is used when reproducing the digital image information stored in the memory circuits 11. Accordingly, the automatic image changing and reproducing display device of the present invention can be separated from the image recording and reproducing devices such as imaging devices like television cameras, VTRs, LD players, DVD players and also from computer devices such as personal computers and engineering workstations.

Accordingly, when carrying out the repeated reproduction of digital image information, the automatic image changing and reproducing display device of the present invention stops each of said each components, so that the problems associated with conventional techniques such as malfunctions of some components due to structural rotation, mechanical contacts, light emitting diodes, and electrostatic breakdown are dramatically improved, and, as a result, the reliability of the whole system is enhanced and long service life and reduced size are provided.

The first embodiment of the present invention has been explained with reference to the figures, and it should be noted that the present invention is not limited to this embodiment, and variants thereof can be envisaged without exceeding the scope of the invention.

For example, although the automatic image changing and reproducing display devicinthe same basic structure as that shown in FIG. 1, the medium storage portion 20 (shown in FIG. 1) is replaced by integrating a plurality of memory circuits 11 (shown in FIG. 1) and the automatic image changing circuit 19 (shown in FIG. 1) with a different medium storage portion comprising the automatic image changing circuit 19' and a plurality of outside memory devices 2, detachably connected at the outside of the automatic image changing and reproducing display device 1', such as at least one memory card constituted by semiconductor elements like ROMs, which have a sufficient memory capacity to store images and the like with hundreds of frames and with a length of more than a few minutes.

The digital image information 16 encoded and compressed into a reduced size in advance according to MPEG 2 by an outside encoding device (not shown) stored in the outside memory device 2 is input to the automatic image changing and reproducing display device 1'.

Accordingly, the automatic changing and reproducing display device 1' shown in FIG. 2 differs from the automatic image changing and reproducing display device 1 shown in FIG. 1 in that the medium storage portion 20 (shown in FIG. 1) composed of a plurality of memory circuits 11 storing the digital image information 16 and the automatic image changing circuit 19 is eliminated from the former device 1 and alternatively the latter 1' has an outside medium storage portion 20' consisting of an automatic image changing circuit 19' and a plurality of memory devices 2 composed of memory cards for storing the digital image information.

Next, the operation of the second embodiment will be described with reference to FIG. 2.

The automatic image changing circuit 19', following a control signal 18 input from the control circuit 15, controls changing of the outside memory circuits 2 composed such as a plurality of memory cards; and the automatic changing circuit 19', following a control signal 18', activates a particular memory circuit such as one card of those memory cards, and the digital image information 16 stored in the particular memory card is output to the decoder 12 in the next stage.

The decoding circuit 12, following a control signal 18 input from the control circuit 15, executes decompression and decoding according to MPEG 2 of the digital information 16' input from the outside memory device 2 having a sufficient capacity and composed of semiconductor elements such as the memory cards and the thus extended and decoded digital image information 16' is output to the D/A converter 13.

The D/A converter 13, following a control signal 18 input from the control circuit 15, then converts the digital image information 16' into analog signals and the thus converted analog signals 17 are output to the image display circuit 14. The image display circuit displays the analog image signal 17 input from the D/A converter 13 as images.

As described above, the present invention provides two types of the digital image changing and reproducing display devices for storing the digital image information and displaying the images. One type of device is provided with a medium storage portion 20 comprising a plurality of memory circuit 11 constructed by semiconductor elements such as ROMs having a sufficient memory capacity for storing the digital image information. The other type of devices is provided with a plurality of outside memory devices including more than one memory card also having a sufficient memory capacity. Those two types of device are constructed on the same basic structure that both devices comprise the automatic image changing circuit 19 and the decoding circuit 12 capable of processing according to MPEG 2. Both types of the digital image changing and reproducing display device according to the present invention provide reliablity, long life, and reduced size image reproducing display devices.

When memory cards are used as a plurality of memory circuits, since it is possible to provide various image reproducing and displaying forms of the analog image signals such as automatically skipping the cards to select a card by providing a card or data detecting circuit in the medium storage portion; forms of the automatic changing at random time intervals and of automatic termination by providing a timer, and since it is obvious to be able to select various modifications by such simple settings, the detailed explanations of such modified forms are omitted.

It should be clearly understood that the present invention is not limited to the above embodiments described herein before, and variants thereof can be envisaged without exceeding the scope of the present invention.

According to the present invention, the image changing and reproducing display device of the present invention comprises a plurality of image memory circuits constructed by semiconductor elements such as ROMs for permanently storing digital image information obtained from image signals of imaging devices such as television cameras, VTRs, LD players, and DVD players, and computer devices such as personal computers and engineering workstations by encoding and compressing the image signals into digital image information (images with hundreds of frames and a length of a few minute) according to MPEG 2 by an outside encoding device. The image changing and reproducing display device of the present invention comprises the above-described memory circuits having sufficient memory capacity for storing the digital image information and the automatic image changing device, so that it is possible to reproduce images by changing a particular digital image information in the whole information stored in the memory circuits, decompressing and decoding said particular digital image information according to MPEG 2 by a decoding circuit, converting the decompressed and decoded image data into the analog image signals, and reproducing the analog image signals by the image display device. Therefore, once the digital image information is stored in the memory circuits, it is always possible to display the reproduced analog signals by reading the digital image information stored in the memory circuits such as ROMs, and by decompressing and decoding the digital image information, regardless of whether or not these devices are operating such as imaging and image recording devices including imaging devices such as television cameras, image recording and reproducing devices such as VTRs, LD players, and DVD players, and computer devices such as personal computers and engineering workstations. Thus, these imaging and image recording devices can be separated from the image changing and reproducing display device of the present invention, and it is possible to operate the image changing and reproducing display device of the present invention while stopping these imaging and image recording devices, so that it is an effect of the present invention that the image changing and reproducing display device of the present invention provides high reliability, long life and reduced size by avoiding malfunctions due to structural rotation, mechanical contacts, reduced life of the laser diode, and breakdown by electrostatic charges.

Provision of a plurality of memory circuits composed of semiconductor elements such as ROMs makes it possible to separate all of those imaging and image recording devices from the image changing and reproducing display device of the present invention, and the use of memory cards for a plurality of memory circuits makes it possible to reduce the size of the whole memory circuit and also makes it possible to reduce the medium storage portion.

Furthermore, provision of the automatic image changing portion for changing the digital image information an electric circuit makes it possible to reduce the size of not only the automatic image changing portion but also the whole the image changing and reproducing display device.

What is claimed is:

1. An automatic image changing and reproducing display device comprising:
   - a plurality of memory circuits for storing digital image information which is encoded and compressed by a particular technique;
   - a decoding circuit for decompressing and decoding said digital image information stored in said memory circuits and for outputting a result as digital image data;
   - a D/A converter for converting said digital image data and for outputting a result of conversion as analog image signals; and
   - an image display circuit for displaying said analog image signals;
   - the automatic image changing and reproducing display device further comprising;
   - an automatic changing circuit for automatically changing and selecting a particular piece of said digital image information from among plural pieces of digital image information stored in said plurality of memory circuits, when said digital image information is composed of the plural pieces of digital image information.

2. An automatic image changing and reproducing display device according to claim 1, wherein said plurality of memory circuits, comprising semiconductor elements, possess a memory capacity for storing said digital image information as encoded and compressed data corresponding to more than hundreds of frames or a length of video of more than a few minutes.

3. An automatic image changing and reproducing display device according to claim 1, wherein said plurality of memory circuits comprises detachable memory devices, in which said digital image information is stored.

4. An automatic image changing and reproducing display device according to claim 3, wherein detachable memory devices possess a memory capacity for storing said digital image information as encoded and compressed data corresponding to more than hundreds of frames or a length of video of more than a few minutes.

5. An automatic image changing and reproducing display device according to claim 1, wherein said digital image information is encoded and compressed by predetermined coding codes.

* * * * *